(12) United States Patent
Gupta et al.

(10) Patent No.: US 6,957,309 B1
(45) Date of Patent: Oct. 18, 2005

(54) METHOD AND APPARATUS FOR RE-ACCESSING A FIFO LOCATION

(75) Inventors: Jay K. Gupta, Sunnyvale, CA (US); Somnath Paul, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 341 days.

(21) Appl. No.: 10/324,308

(22) Filed: Dec. 18, 2002

(51) Int. Cl.[7] .............................................. G06F 12/02
(52) U.S. Cl. ...................... 711/154; 711/109; 711/110; 711/155; 711/156
(58) Field of Search ............... 710/52–56; 365/189.05, 365/230.08; 711/109, 110, 154–156

(56) References Cited

U.S. PATENT DOCUMENTS

| | | | | |
|---|---|---|---|---|
| 4,965,794 A | * | 10/1990 | Smith ......................... | 370/506 |
| 5,079,693 A | * | 1/1992 | Miller ........................ | 711/156 |
| 5,182,651 A | * | 1/1993 | Kishi ......................... | 358/296 |
| 6,347,097 B1 | * | 2/2002 | Deng ......................... | 370/498 |
| 6,584,584 B1 | * | 6/2003 | Smith ......................... | 714/42 |

OTHER PUBLICATIONS

Nilam Ruparella, *Delivering Ethernet Over Sonet Using Virtual Concatenation*, CommsDesign, Feb. 25, 2002, 8 pages, www.commsdesign.com/story/OEG20020225S0078.

Louis E. Frenzel, *Programmable Framer Chip Improves OC-48 Efficiency*, Electronic Design, Apr. 16, 2001, 4 pages.
Michael Timothy Moore, *Filling the WAN-Communications-Line Card*, designfeature, Apr. 18, 2002, 5 pages, www.ednmag.com.

* cited by examiner

*Primary Examiner*—T Nguyen
(74) *Attorney, Agent, or Firm*—Blakely, Sokoloff, Taylor & Zafman LLP

(57) ABSTRACT

In one embodiment, the invention is an apparatus. The apparatus includes a FIFO array having a first plurality of memory elements, each memory element having a predetermined number of bits, the FIFO array having a read pointer. The apparatus also includes a FIFO control register array having a second plurality of memory elements, each memory element of the second plurality corresponding to a memory element of the first plurality of memory elements, the read pointer suitable for accessing the FIFO control register array. The apparatus further includes a control logic block coupled to the FIFO control register array and the FIFO array. The control logic block is to receive a data value of the memory element of the FIFO control register array pointed to by the read pointer. The control logic block is also to signal the read pointer to stall responsive to the data value having a first value.

21 Claims, 6 Drawing Sheets

METHOD AND APPARATUS FOR RE-ACCESSING A FIFO LOCATION

FIELD

The invention relates generally to circuits and methods of operating circuits, and more specifically to circuitry suitable for operating a FIFO (first-in-first-out) memory.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include assembling the bits of a stream into bytes, or breaking down a packet into double words for example. One component often used for this purpose is a FIFO (first-in-first-out) memory.

FIG. 1 illustrates an embodiment of a conventional circuit for processing data from a network. This circuit includes a FIFO, and may be used in the interface between a network and a computer. The circuit is used to receive data from a network interface, and provide that data to a processor which may assemble it in a manner suitable for use by a computer, or for transmission over another (different) network. The data is received and written into a FIFO, and is then read out from the FIFO into data registers. A reaccess compute module determines whether the next data in the FIFO is needed, or if the data already in one of the data registers needs to be accessed again (reaccessed). Whichever data is selected is then provided to the next stage in the processing circuitry.

Data 105 is received from a network at DEMUX (demultiplexer) 115, through a physical interface for example. Data 105 is of a predetermined data width. Channel select signal 120 determines which channel the data goes to through DEMUX 115. The output of DEMUX 115 is data and write control signal 125, which is steered to the proper FIFO 135 of FIFOs 130, based on channel select signal 120. The write control signal of data and write control 125 causes the data 125 to be written into FIFO 135. The data is then held in FIFO 135 until the next portion of the processing circuitry is ready for it.

The output data 140 of FIFO 135 (and of all of the FIFOs 130) is provided to register group 145 and to MUX (multiplexer) 160. The output data 140 is made available responsive to read control signal 180. The output data 140 may be stored in register A 150 and/or register B 155, also responsive to the read control signal 180. The outputs of register A 150 and register B 155 are made available to MUX 160.

Reaccess compute module 170 determines which of the inputs to MUX 160 should be selected as MUX output 165, and selects that input using source select signal 175. If the data that is to be provided to the next portion of processing circuitry is the data currently available from FIFO 135, that is selected, and it is read using read control signal 180. Otherwise, data previously read from FIFO 135, and currently in either of register A 150 or register B 155 is selected for reaccess. The output data 165 is then passed through as data 185 to the next portion of processing circuitry. Data 185 is also of a predetermined data width.

Having the register group 145 involves providing extra space and added circuitry (the MUX 160 for example), beyond what is normally involved in a FIFO. This is provided because the typical FIFO only provides data for reading once, and then moves on to the next data storage location in the FIFO. Thus, extra storage and data paths must be provided to allow for access of data from the FIFO a second time. Furthermore, the data may stay in the FIFO for long periods of time until it is accessed. However, a determination is made as to whether data must be reaccessed only when the data is first accessed, and not before. Typically, whether the data must be reaccessed or not is determined based on the effective output data width of data 105 as received from the network interface. The effective output data width may be determined by combining the data width of data 105 as received from the network interface with any data to be inserted prior to providing the data at the output. Such data to be inserted may be predicted at the time data 105 is available at the network interface, and may be inserted at the output stage of the FIFO for example (using additional logic not shown).

SUMMARY

In one embodiment, the invention is an apparatus. The apparatus includes a FIFO array having a first plurality of memory elements, each memory element having a predetermined number of bits, the FIFO array having a read pointer. The apparatus also includes a FIFO control register array having a second plurality of memory elements, each memory element of the second plurality corresponding to a memory element of the first plurality of memory elements, the read pointer suitable for accessing the FIFO control register array. The apparatus further includes a control logic block coupled to the FIFO control register array and the FIFO array. The control logic block is to receive a data value of the memory element of the FIFO control register array pointed to by the read pointer. The control logic block is also to signal the read pointer to stall responsive to the data value having a first value.

In an alternate embodiment, the invention is a method of operating a FIFO. The method includes reading a first data value and corresponding first control value from a plurality of data and corresponding control values of the FIFO, the first data value and control value pointed to by a read pointer. The method also includes determining whether the read pointer should be incremented based on the first control value. The method further includes stalling the read pointer responsive to the first control value being a first value.

In another alternate embodiment, the invention is also a method of operating a FIFO. The method includes receiving a first data value. The method also includes generating a first control value corresponding to the first data value. The method further includes storing the first data value and the first control value in the FIFO.

BRIEF DESCRIPTION OF THE DRAWINGS

The present invention is illustrated by way of example and not limitation in the accompanying figures.

DETAILED DESCRIPTION

Figure 1:
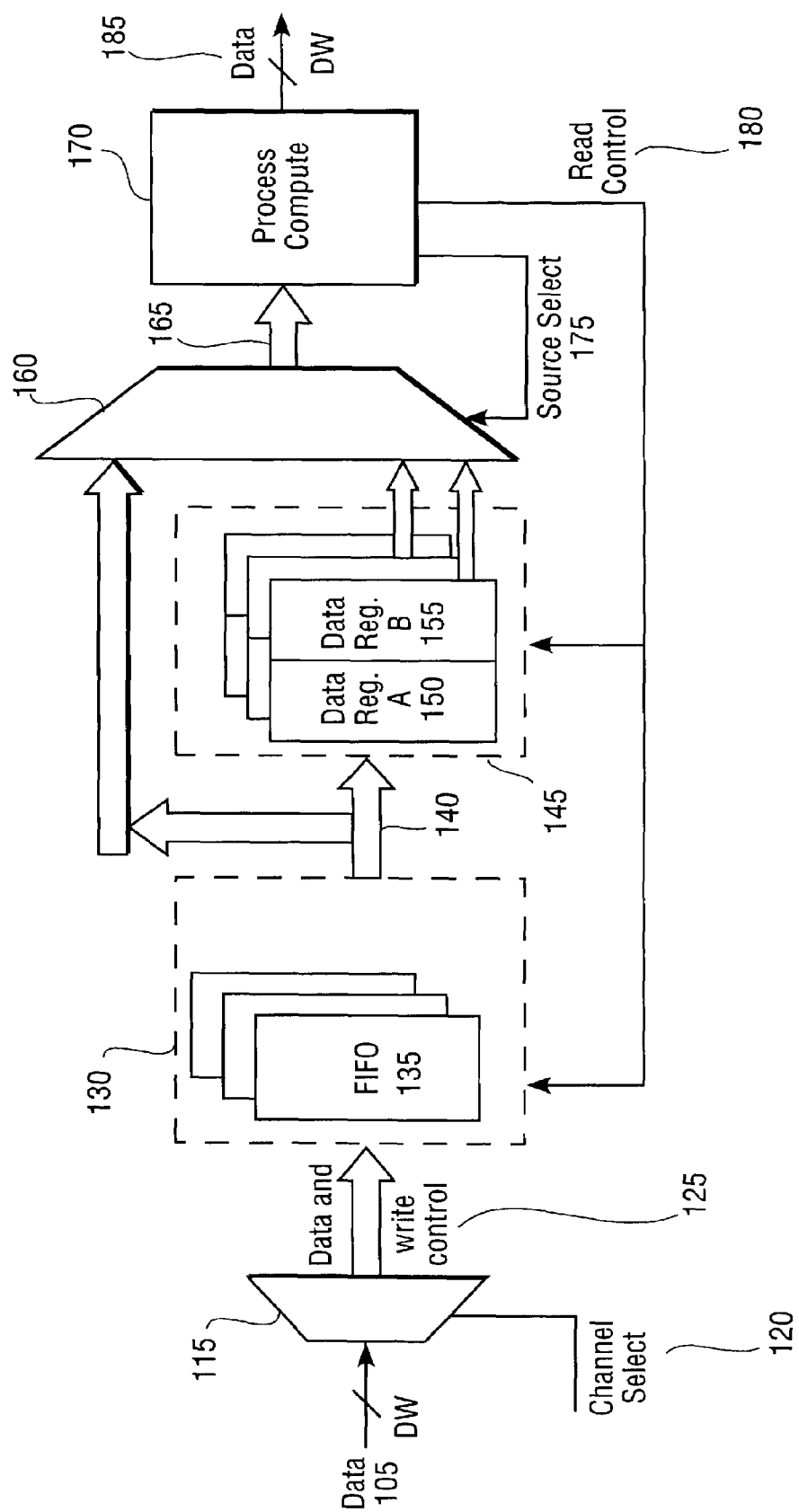
FIG. 1 illustrates an embodiment of a conventional circuit for processing data from a network.

A method and apparatus for re-accessing a FIFO location is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

The method and apparatus, in various embodiments, uses the inherent delays in network processing to reduce the circuitry required. When data is received, its output data width is pre-computed, thereby determining whether the data will need to be accessed once or multiple times when it is finally accessed. If the precomputed data output width is less than or equal to the data-out width available, a single access will be sufficient. If the precomputed data width is greater than the data-out width available, multiple accesses will be necessary. This determination may be encoded as a single bit in some embodiments, and that bit is stored in a special control register FIFO which has entries corresponding to entries in a data FIFO. When the time comes to access the data in the data FIFO, the corresponding bit of the control FIFO determines whether the data must be accessed once or multiple times. If multiple accesses are required, the accessing circuitry may stall the read pointer of the data FIFO (and control register), thereby preserving the data to be read in the data FIFO for multiple accesses.

In one embodiment, the invention is an apparatus. The apparatus includes a FIFO array having a first plurality of memory elements, each memory element having a predetermined number of bits, the FIFO array having a read pointer. The apparatus also includes a FIFO control register array having a second plurality of memory elements, each memory element of the second plurality corresponding to a memory element of the first plurality of memory elements, the read pointer suitable for accessing the FIFO control register array. The apparatus further includes a control logic block coupled to the FIFO control register array and the FIFO array. The control logic block is to receive a data value of the memory element of the FIFO control register array pointed to by the read pointer. The control logic block is also to signal the read pointer to stall responsive to the data value having a first value.

In an alternate embodiment, the invention is a method of operating a FIFO. The method includes reading a first data value and corresponding first control value from a plurality of data and corresponding control values of the FIFO, the first data value and control value pointed to by a read pointer. The method also includes determining whether the read pointer should be incremented based on the first control value. The method further includes stalling the read pointer responsive to the first control value being a first value.

In another alternate embodiment, the invention is also a method of operating a FIFO. The method includes receiving a first data value. The method also includes generating a first control value corresponding to the first data value. The method further includes storing the first data value and the first control value in the FIFO.

Figure 2:
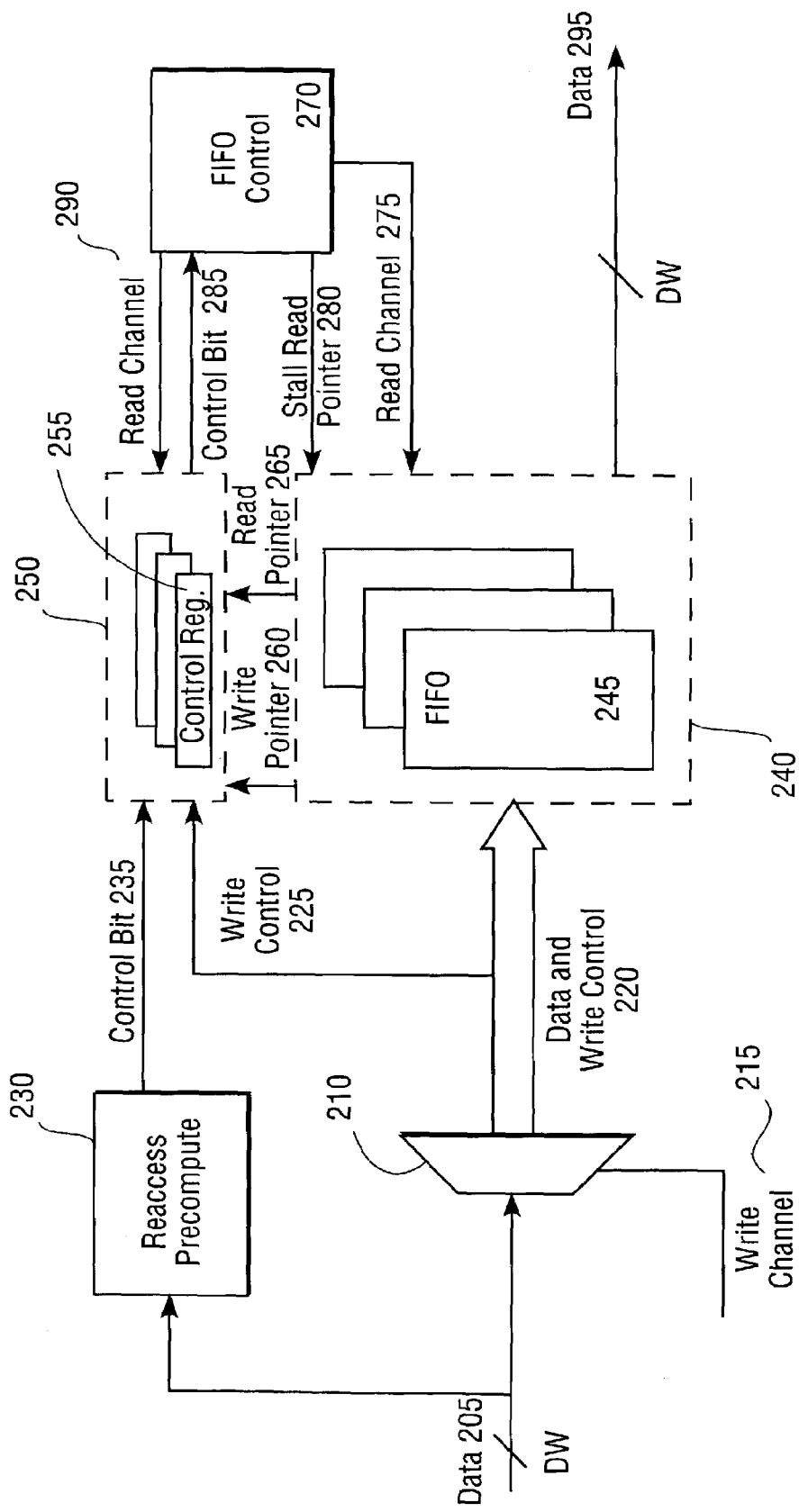
FIG. 2 illustrates an embodiment of a circuit for processing data from a network.

FIG. 2 illustrates an embodiment of a circuit for processing data from a network. This embodiment may be used to process the data using the inherent delays in network processing. Data 205 is received from a network interface, and is presented to both DEMUX (demultiplexer) 210 and reaccess precompute module 230. DEMUX 210, in conjunction with write channel select signal 215, forwards the data and write control signal 220 to FIFOs 240 and the write control signal 225 to control registers 250. Reaccess precompute module 230 determines whether a single access or multiple accesses of the data 205 will be required. The result of this determination is encoded as a single control bit 235, which is presented to control registers 250. Furthermore, linking control registers 250 and FIFOs 240 are write pointer 260 and read pointer 265. Thus, control bit 235 and data 220 are both written to corresponding locations (such as in FIFO 245 and control register 255) responsive to write signal 225.

Having written the data 220 to FIFO 245 and the control bit 235 to control register 255, the operations are then performed to read data from FIFO 245. FIFO control 270 determines when more data should be accessed. Using read channel signals 290 and 275, the appropriate FIFO of FIFOs 240 and the corresponding control register of control registers 250 are read. If control bit 285 has a first value, FIFO control 270 activates stall read pointer signal 280, thereby stopping incrementing of read pointer 265 (the internal read pointer for the FIFO in question). If control bit 285 has a second value, stall read pointer signal 280 is not activated, and read pointer 265 increments as it normally would in a FIFO. Thus, the data 295 output from the FIFO 245 will be output once or multiple times, as determined by the corresponding control bit of control register 255.

Note that write pointer 260 and read pointer 265 need not link the two FIFO components. In some embodiments, A control register and FIFO may have independent pointers (generated by independent logic) which may be used for accessing each respective component. Alternatively, in some embodiments, a control register and FIFO may have common write pointers (or a write pointer derived in one component from the write pointer of the other component) and independently generated read pointers. Similarly, in some embodiments, the read pointers may be common and the write pointers generated independently, depending on system requirements.

Figure 3:
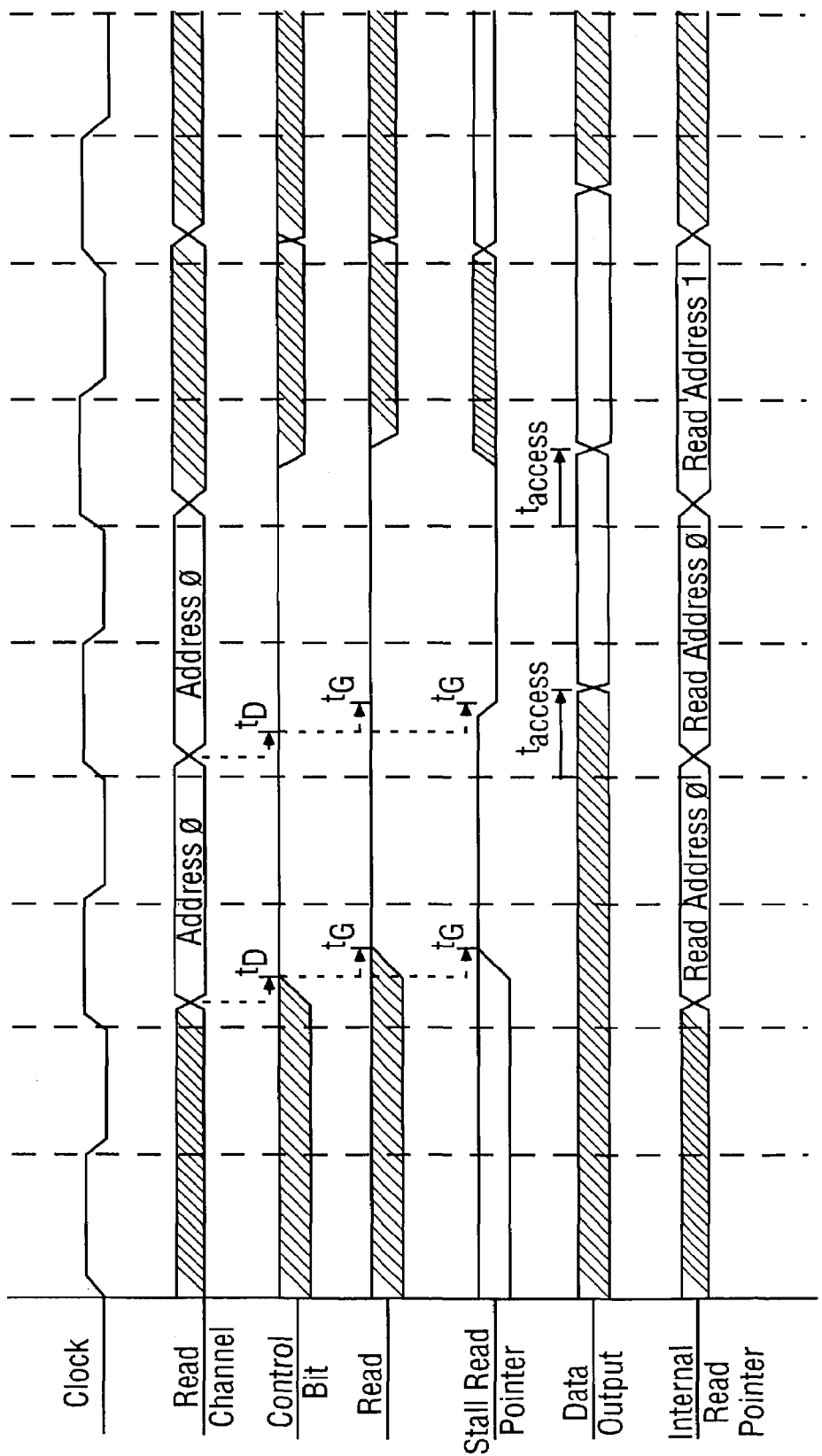
FIG. 3 illustrates a timing diagram related to the embodiment of FIG. 2.

FIG. 3 illustrates a timing diagram related to the embodiment of FIG. 2. Aligned to the clock, an address (channel number) is provided, in this case address 0. After a delay of time td, a control bit stabilizes as the output of the corresponding control register, in this example as a '1'. After a further delay tg, a read signal and a stall read pointer signal are generated, with the stall read pointer signal activated (active high in this example). The internal read pointer of the FIFO thus remains at address 0, and the data output does not vary from the first to the second read cycle. However, in the second read cycle, the stall read pointer signal is deactivated (deasserted and set low), such that the read address increments to 1 following the second access. Effectively, the data at address 0 of the FIFO is read twice, so that all bits can be accessed even though the output bandwidth available is too narrow for the data in the FIFO. This particular example assumes that two accesses are sufficient, but three or more accesses may be built into the system without undue experimentation.

Figure 4:
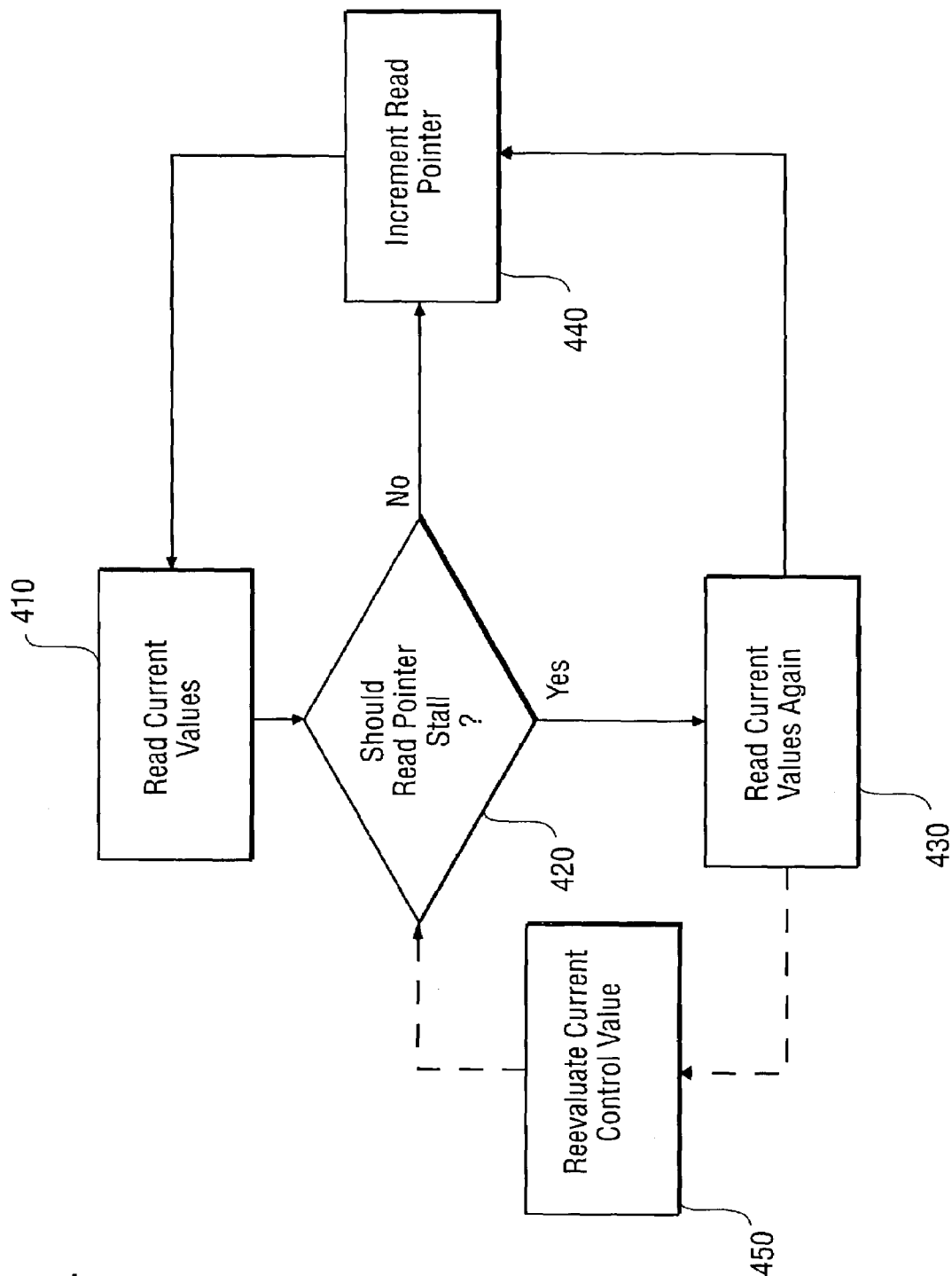
FIG. 4 illustrates an embodiment of a method of processing data as a flow diagram.

FIG. 4 illustrates an embodiment of a method of processing data as a flow diagram. This method relates to the manner in which data is read from the FIFOs. At block 410, the current values of the FIFO and corresponding control register are read, based on the current position of the FIFO read pointer (and control register read pointer if applicable). Based on the value of the control register, at block 420, a determination is made as to whether the read pointer of the FIFO should be stalled or not. A first value causes the read pointer to be stalled. A second value causes the read pointer to be left unaffected. If the read pointer is to be left unaffected, at block 440 the read pointer is incremented and the process returns to block 410 for the next read. If the read pointer is to be stalled, at block 430, the current values are read again, such that the current value of the FIFO may be used a second time. In some embodiments, the read pointer is then incremented at block 440, and the process returns to block 410 for the next read.

In alternate embodiments, the current control value is reevaluated at block 450, to determine whether it should continue to encode a stall of the read pointer or whether the read pointer should be left unaffected. The process then flows to block 420, for another determination on stalling the read pointer, thus allowing for several accesses of the same data of the FIFO. Note that in cases where the control register and FIFO have independent read pointers, the references to a read pointer for FIG. 4 refer to actions taken with respect to both the control register and the FIFO read pointers.

Figure 5:
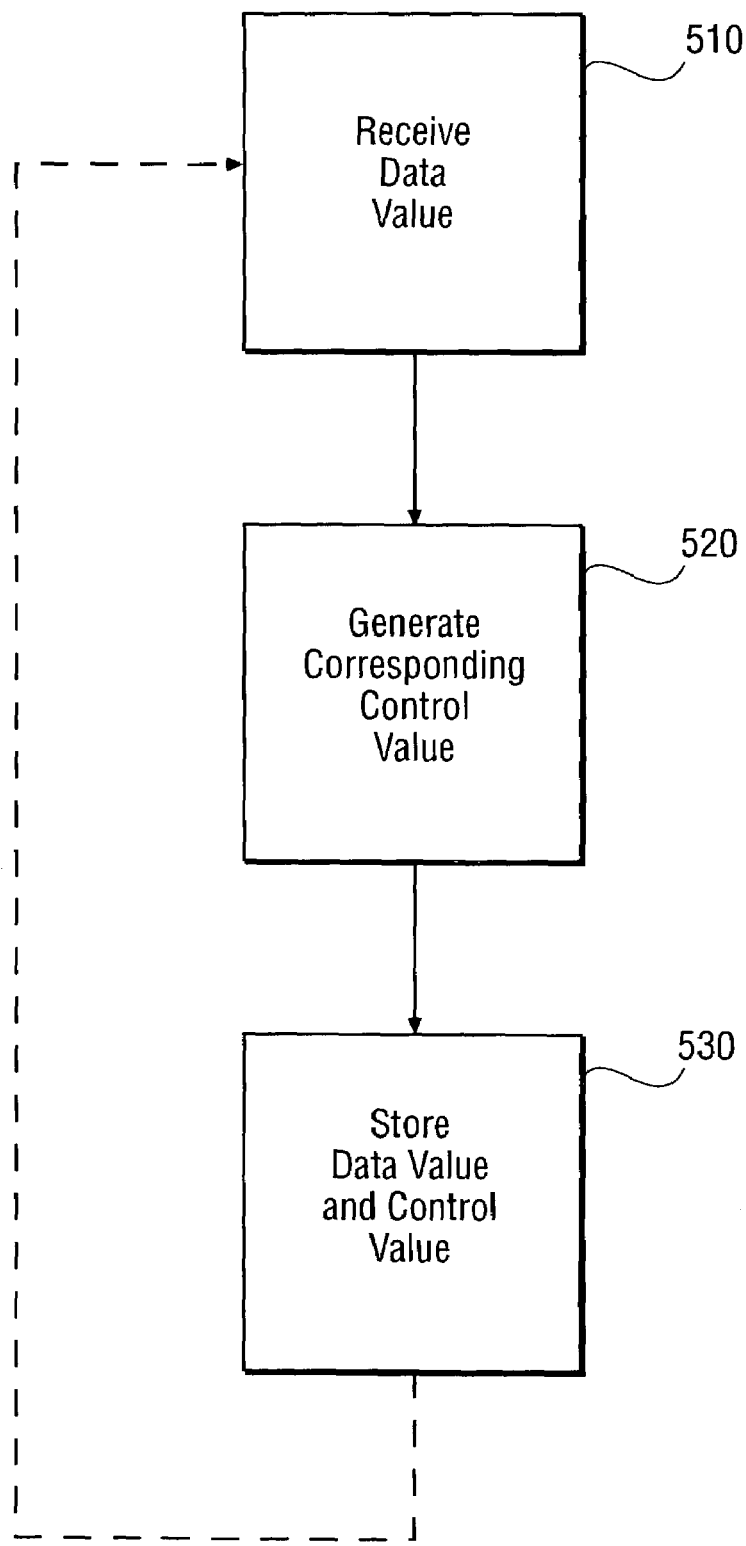
FIG. 5 illustrates an alternate embodiment of a method of processing data as a flow diagram.

FIG. 5 illustrates an alternate embodiment of a method of processing data as a flow diagram. This embodiment relates to storing data in a FIFO from a network interface. At block 510, a data value is received. At block 520, a corresponding control value is generated. In one embodiment, this control value is generated responsive to the data width of the data received. If the precomputed data out width is greater than the data-out width available, a first value for the control value is generated. If the precomputed data out width is equal to or less than the data-out width available, a second value for the control value is generated. At block 530, the data value received and the control value are each stored in corresponding storage locations. Typically, the process may be expected to repeat.

Figure 6:
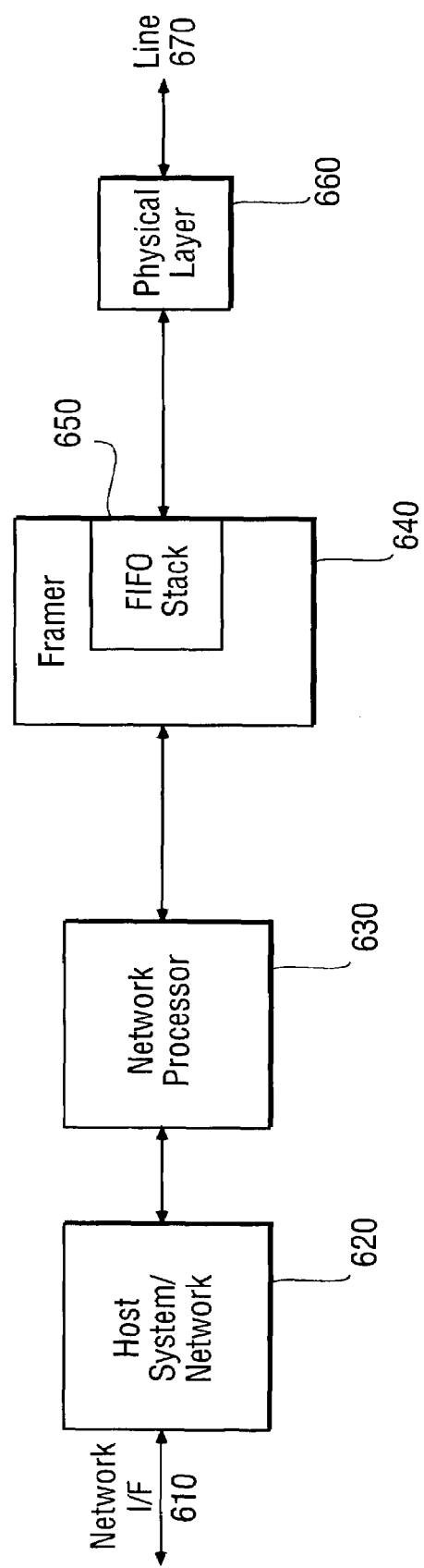
FIG. 6 illustrates an embodiment of a system useful for processing data.

FIG. 6 illustrates an embodiment of a system useful for processing data. This system may be used as an interface between an external network and an internal network, such as between a subscriber line and an internal Ethernet network. Network interface 610 is the interface to an internal local area network. Host system 620 is coupled to network interface 610, and interacts with the internal local area network. Network processor 630 is coupled to host system 620, and processes data received from the host system or from an external network. Framer 640 is coupled to network processor 630, and frames data for transmission on line 670, and deframes data received from line 670. Framer 640 includes FIFO stack 650, which may be implemented as illustrated in the embodiment of FIG. 2 for example. Physical link 660 is coupled to framer 640, and translates the physical signals received on line 670 (light pulses for example) into electrical signals suitable for use with framer 640. Line 670 is a link to an external network, such as a fiber optic or a radio link for example. In one embodiment, FIFO stack 650 receives data (directly or indirectly) from network processor 630 (or from a similar link layer device for example) and provides data (again directly or indirectly) to physical link 660 (or a similar physical link layer device for example). FIFO stack 650 may be used in other contexts to buffer data which may be expanded at the FIFO stage, thus requiring re-access at the FIFO output stage.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 2 may be integrated into components, or may be subdivided into components. Similarly, the blocks of FIG. 5 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. An apparatus comprising:
    a FIFO array having a first plurality of memory elements, each memory element having a predetermined number of bits, the FIFO array having a read pointer;
    a FIFO control register array having a second plurality of memory elements, each memory element of the second plurality corresponding to a memory element of the first plurality of memory elements, the read pointer suitable for accessing the FIFO control register array; and
    a control logic block coupled to the FIFO control register array and the FIFO array, the control logic block to receive a data value of the memory element of the FIFO control register array pointed to by the read pointer, the control logic block to signal the read pointer to stall responsive to the data value having a first value.

2. The apparatus of claim 1, wherein:
    the control logic block further to signal the read pointer to increment responsive the data value having a second value.

3. The apparatus of claim 2, further comprising:
    a pre-compute processor to compute the data value responsive to an indication of a width of incoming data for a corresponding memory element of the FIFO array.

4. The apparatus of claim 2, further comprising:
means for pre-computing the data value based on an indication of a width of incoming data for a corresponding memory element of the FIFO array.

5. The apparatus of claim 3, further comprising:
a write pointer of the FIFO array, the write pointer suitable for accessing the FIFO control register array.

6. The apparatus of claim 5, further comprising:
an incoming data register coupled to the FIFO array, the incoming data register suitable for holding data prior to writing the data to a memory element of the FIFO array indicated by the write pointer.

7. The apparatus of claim 6, wherein:
the incoming data register to receive a write control signal, the incoming data register to store incoming data responsive to the write control signal.

8. The apparatus of claim 7, further comprising:
a framer, the framer including the FIFO array, the FIFO control register array, the control logic block, the pre-compute processor, and the incoming data register.

9. The apparatus of claim 8, further comprising:
a network processor coupled to the framer; and
a physical link layer coupled to the framer.

10. The apparatus of claim 9, further comprising:
a host system coupled to the network processor.

11. A method of operating a FIFO, comprising:
reading a first data value and corresponding first control value from a plurality of data and corresponding control values of the FIFO, the first data value and control value pointed to by a read pointer;
determining whether the read pointer should be incremented based on the first control value; and
stalling the read pointer responsive to the first control value being a first value.

12. The method of claim 11, further comprising:
incrementing the read pointer responsive to the first control value being a second value.

13. The method of claim 12, further comprising:
incrementing the read pointer responsive to a second request when the first control value is the first value.

14. The method of claim 13, further comprising:
generating the first control value responsive to an indication of the data width of the first value.

15. The method of claim 14 wherein:
the FIFO is subdivided into a control register and a data FIFO having common read and write pointers.

16. The method of claim 14 wherein:
the FIFO is subdivided into a control register having a control read pointer and a data FIFO having a data read pointer.

17. A method of operating a FIFO, comprising:
receiving a first data value;
generating a first control value corresponding to the first data value, wherein the first control value is generated responsive to a data width of the first data value; and
storing the first data value and the first control value in the FIFO.

18. The method of claim 17, wherein:
the first data value and the first control value are stored at locations in the FIFO determined by a write pointer of the FIFO.

19. The method of claim 18, wherein:
the first control value having a first value if the first data value is wider than a predetermined width and the first control value having a second value if the first data value is narrower than a predetermined width.

20. The method of claim 19 wherein:
the FIFO is subdivided into a control register and a data FIFO having common read and write pointers.

21. The method of claim 19 wherein:
the FIFO is subdivided into a control register having a control read pointer and a data FIFO having a data read pointer.

* * * * *